United States Patent Office 2,944,993
Patented July 12, 1960

2,944,993

GLASS-REINFORCED THERMOPLASTIC RESIN COMPOSITIONS BASED ON SYNTHETIC LINEAR POLYPYROMELLITIMIDES

Donald Lee Brebner, Claymont, and Walter Murray Edwards, Ivan Maxwell Robinson, Edward Noonan Squire, and Howard Warner Starkweather, Jr., Wilmington, Del., assignors to E. I. du Pont de Nemours and Company, Wilmington, Del., a corporation of Delaware No Drawing. Continuation of application Ser. No. 515,244, June 13, 1955. This application Oct. 7, 1957, Ser. No. 688,441

7 Claims. (Cl. 260—37)

This invention relates to novel organic resin/glass compositions and to mixtures useful in preparing them. The invention is especially concerned with reinforced plastic compositions having a combination of desirable properties including the capacity to be rapidly postformed, and with mixtures which may be readily converted into such postformable compositions.

This application is a continuation of U.S. Serial No. 515,244, filed June 13, 1955, now abandoned.

Reinforced plastic compositions based on glass and thermosetting plastics are known to be readily prepared and to possess a number of attractive properties, but they are difficult to fabricate rapidly. Reinforced plastic compositions based on glass and thermoplastic resins are known to be capable of fabrication by rapid postforming techniques, but in general have relatively poor resistance to either mechanical stress, high temperature, electricity, or moisture. In many cases they are also difficult to prepare.

It is a general object of the present invention to provide novel resin/glass compositions based on thermoplastic resins which manifest surprisingly high strength and resistance to boiling water, and may in addition be readily postformable and possess excellent high temperature and electrical properties. A further object is to provide novel mixtures which may be readily converted into compositions of this kind. Other objects will be apparent hereinafter.

According to the present invention it has been found that resin/glass compositions based on certain high-molecular-weight polypyromellitimides manifest the sought-for combination of properties. It has further been found that mixtures of glass and low molecular weight polypyromellitimides may be readily and rapidly converted into reinforced plastic compositions of this type.

Synthetic linear polyimides may be obtained by the condensation polymerization of tetracarboxylic acids or their imide-forming derivatives with diprimary diamines having a radical length of at least four, as disclosed in British Patent 570,858. In U.S. Patent 2,710,853, issued to W. M. Edwards and I. M. Robinson, it is disclosed that synthetic linear polypyromellitimides, based on pyromellitic acid and diprimary diamines of the group consisting of 3-methyl heptamethylene diamine, 4,4-dimethyl heptamethylene diamine, and nonamethylene diamine, have a unique combination of physical properties, especially at elevated temperatures. This high molecular weight synthetic linear polypyromellitimides with which the present invention is concerned include those hereinabove mentioned as disclosed by Edwards and Robinson, and in general comprise high molecular weight synthetic linear polypyromellitimides having low to moderate crystallinity, a glassy state transition temperature of at least 100° C., and a crystalline melting point below 400° C. Of these poly-4,4-dimethylheptamethylenepyromellitimide is especially preferred.

"High molecular weight synthetic linear polypyromellitimide," as used herein, refers to a synthetic polypyromellitimide which is soluble in meta-cresol, and which manifests an inherent viscosity of at least 0.4 as measured at 0.5% concentration in meta-cresol at 25° C. "Low to moderate crystallinity" refers to a degree of crystallinity in the range of 10 to 60% as determined by cooling a sample of polymer from above its crystalline melting point to below 100° C. during about 3 minutes, continuously recording an X-ray spectrometer diffraction pattern of the sample after it is cooled, and then comparing the crystalline and amorphous regions of the recorded patterns. "Glassy state transition temperature" is defined in the aforementioned Edwards and Robinson patent, and refers generally to that temperature below the melting point at which many of the physical properties of the polymer begin to change sharply. Crystalline melting point refers to temperature at which substantially all of the X-ray patterns characteristic of crystallinity disappear.

The polypyromellitimides in the aforesaid category have been found to possess the capacity to form surprisingly strong, moisture-resistant bonds with glass surfaces, by reason whereof resin/glass composites, having a plurality of glass surfaces bonded together with these resins, are also surprisingly strong and moisture-resistant. The high rigidity of these composites is not affected by temperatures of 100° C., and they withstand boiling water or steam without appreciable change in form or strength. Nevertheless, being based on thermoplastic resins, which are capable of flowing and rewelding to themselves at temperatures in the range of 300 to 400° C., they may be readily and rapidly postformed, without the inconvenience of controlling cure time, or preliminary degree of cure, as in postforming thermosetting plastic composites. Moreover, because glass itself is postformable at these temperatures, it is frequently possible to effect surprisingly deep draws without creating resin-starved or broken reinforcement areas in the resulting fabricated articles. In addition, the fact that these resins are of low to moderate crystallinity makes it possible to obtain composites which have the capacity to retain very high percentages of their rigidity at elevated temperatures, for example, up to 70% at 250° C. They may also manifest excellent electrical properties.

A wide variety of polypyromellitimides in addition to those hereinabove mentioned, are suitable components of the compositions of the present invention. In addition to those hereinabove mentioned, these include, for example, homopolymers, such as those based on heptamethylene diamine, octamethylene diamine, or decamethylene diamine, and copolymers, such as those based on mixtures of nonamethylene diamine and hexamethylene diamine in mole ratios of at least 5 to 1, mixtures of di(paraaminocyclohexyl) methane and hexamethylene diamine in 7/1 mole ratio, mixtures of nonamethylene diamine and di(paraaminocyclohexyl) methane in mole ratio of at least 3/1, mixtures of 4,4-dimethyl heptamethylene diamine and di(paraaminocyclohexyl) methane in mole ratio of at least 1/2, and the like. As previously indicated the suitable polymers are characterized by low to moderate crystallinity, glassy state transition temperature above 100° C., and crystalline melting point below 400° C. In general composites based on polypyromellitimides of very low crystallinity, such as the homopolymer derived from 2,11-diaminododecane, invariably fall off very rapidly in strength properties at temperatures above their glassy state transition temperature. Composites based on polypyromellitimides having a glassy state transition temperature below 100° C. such as the homopolymers derived from 1,2-bis-(3-aminopropoxy)-ethane do not possess the desirable property of being substantially unaffected by boiling water. Composites based on polypyromellitimides melting above 400° C. such as the homopolymers of di(paraaminocyclohexyl)-methane are difficult to fabricate without causing degradation, as evidenced by bubbled or brittle areas in the ultimate products. It should be noted, however, that it is not critical in the practice of the present invention that the resin components possess a high degree of flowability of thermal stability at temperatures in the vicinity of their melting points although high thermal stability is desirable.

The composites of the present invention may be prepared from any of the several forms of glass commonly used in preparing composite articles of glass and organic plastics, including powders, fibers, filaments, yarns, chopped fiber mats, woven fabrics, and solid plates. Choice of form depends upon the particular characteristics desired in the ultimate article, in accordance with considerations herein disclosed, and others well known in the art. Composites having a least dimension not exceeding about ⅛ inch, based on fibrous glass, especially woven glass cloth, and particularly, laminated structures, are preferred for maximum strength and postformability. For improved retention of stiffness at elevated temperatures above 100° C., with the resins of relatively low crystallinity, such as poly-4,4-dimethyl heptamethylene-pyromellitimide, the weight ratio of resin to glass fiber is preferably in the range of 3/7 to 4/6, the radius of the fibrous glass is preferably at least 0.0001 inch, and the length of the glass fibers is preferably at least 0.125 inch. With resins of moderate crystallinity such as polynonamethylene pyromellitimide, the weight ratio of resin to glass fiber may be 4/1 to 3/7, while the fiber should be at least 0.0001 in. in radius and at least 0.25 in. long. In any case the glass surfaces should be grease free and thoroughly dry before use.

Preferably the high molecular weight resin/glass composites of the present invention are substantially void-free structures in which all glass surfaces, not externally exposed, are thoroughly wetted by the resin since these exhibit maximum strength and minimum moisture absorption. In some instances, adequate freedom from voids and wetting of the glass may be achieved by heating alternate layers of glass and films of resin, of inherent viscosity in the range of 0.4 to 0.8, under pressure. Alternatively, at somewhat greater expense and inconvenience, the glass surfaces can be coated with resin from solution in meta-cresol or other effective solvent, and subsequently bonded with heat and pressure to obtain substantially void-free structures in which the glass is thoroughly wetted by the resin. The prior art, however, does not solve the problem of preparing such structures conveniently where condensation type polymers are involved. In general, condensation polymers are too viscous when polymerized to high molecular weight to be capable of thoroughly wetting a plurality of surfaces of finely divided glass and flowing in to fill all voids. Polymerization of the resin from low to high molecular weight in the presence of the glass makes it difficult to eliminate condensation by-products and hence leads to a bubbled structure unless long times in expensive polymerization equipment are used.

Contrary to what would be expected from the prior art, however, it has been found that mixtures of glass and low molecular weight solid-stage condensation products of organic salts of pyromellitic diesters and diprimary diamines, said condensation products having an inherent viscosity in the range of 0.04 to 0.4, may be readily and rapidly converted into substantially void-free structures of the type hereinbefore described. The esterifying alcohol may in general be any mono-basic alcohol which is volatile at a temperature below the melting point of the dry organic salt, but is preferably methanol, ethanol, or propanol.

These mixtures may be prepared in various ways, conveniently by (1) impregnating the glass substrate with a solution of the organic salt of the diprimary diamine and pyromellitic diester, in a volatile solvent, (2) evaporating the solvent to deposit the salt on the glass surfaces at a temperature below about 138° C., which is the threshold temperature above which appreciable condensation polymerization commences, and (3) heating the resulting porous mass at a temperature above 138° C. but below the melting point of the resin-forming component, preferably in the range of 138 to 155° C. and ordinarily not above 200° C., until an inherent viscosity in the range of 0.04 to 0.4 is achieved.

Various methods of preparing suitable organic salt solutions are disclosed in the copending application of Edwards et al. (U.S. Ser. No. 515,245), filed on June 13, 1955. A convenient procedure involves warming pyromellitic anhydride with alcohol to obtain a solution of dialkyl pyromellitate (the dialkyl ester of pyromellitic acid), and then adding diamine to obtain a solution of polyalkylene diammonium diethyl pyromellitate. A slight molar excess, for example, 0.1 to 2%, of the diester may be used to function as a viscosity regulator and to minimize color development in the ultimate resin. Impregnation of the substrate glass with the salt solution and evaporation of the solvent at the prescribed temperatures deposits crystalline salt on the glass surfaces in the form of fine particles, leaving a porous mass. Preferably to minimize color development, oxygen is excluded during these steps. The deposited salt may then the partially polymerized in situ in the solid state by heating the porous mass, conveniently for an hour or more in a circulating air oven.

The resulting mixtures of glass and partly polymerized resin-forming material may then be converted into substantially void-free reinforced plastic compositions by heating rapidly to elevated temperatures above 300° C. and above the crystalline melting point of the resin being formed, preferably under slight pressure, and subsequently causing the resin to solidify. Heating may be carried out in various ways, using hot inert gas, dielectric current, infrared radiation, or heated platens as a heat source. Preferably a mold release agent, such as a silicone oil, is used to prevent the heated mass from sticking to its support. Alternatively the mixture may be supported on or between metal foil which is thereafter stripped or dissolved away. The time required to complete the conversion depends upon factors such as the least dimension of the mixture, the particular resin, the actual temperature, and the rate of heat transfer achieved, but in general does not exceed five minutes and is ordinarily less than about two minutes, when the least dimension of the mixture does not exceed about ⅛.

For best results, the thickness of the mixture, in the sense of least dimension, is preferably as low as practicable, taking account of the fact that thicker articles may be prepared readily by laminating the converted mixtures. The temperature used is preferably as far above the melting point of the resin as practicable without causing undue thermal degradation. The rate of heating is also preferably as high as practicable, and pressure is used as necessary to take best advantage of the low viscosity of the resin at the onset of melting, to cause it to fill the void spaces and wet the glass surfaces.

It will be recognized that these mixtures of glass and resin-forming components also possess a unique combination of properties. Thus they may be preformed and heated to transform them into ultimate articles in a manner similar to but ordinarily quicker than that used with mixtures based on thermosetting resin intermediates, but being thermoplastic they yield products which may be reheated and joined to themselves or other articles to form butt-welded or laminated articles.

Other materials in addition to the glass and resin-forming component may also be included in these mixtures to confer special characteristics upon the final products obtainable from them. Examples of such additives include viscosity stabilizers, heat stabilizers, color stabilizers, pigments, dyes, and other fillers of metal, siliceous material, synthetic polymers and the like. Finely divided carbon of colloidal size may be incorporated into a solution of the organic salt previously mentioned, in amounts of about 2 to 10% by weight of the resin, to produce an ultimate product having excellent weather resisting properties. Blowing agents may be similarly incorporated to produce foamed structures in which the resin nevertheless thoroughly wets the glass with which it is in contact. Finely divided polytetrafluoroethylene may be added to produce ultimate articles having improved bearing and anti-stick properties. Various other modifications will be apparent to those skilled in the art.

The several aspects of the invention are more specifically illustrated by means of the following examples, which, however, are not intended to limit its scope.

Example I

Pyromellitic anhydride is dissolved in absolute ethanol with gentle warming to obtain a solution of diethyl pyromellitic acid. An equimolar amount of 4,4-dimethylheptamethylene diamine is slowly added to this solution with constant stirring, and the resulting acid-diamine reaction product is isolated by low temperature evaporation of the ethanol under reduced pressure. The isolated product is redissolved in an approximately equal weight of distilled water. The resulting solution is used to impregnate six individual plies of glass cloth 181-112, which is described as a heat-cleaned satin-weave cloth especially suitable for the preparation of laminates. The impregnated sections are dried in an air oven for 2 hours at 100° C., and subsequently heated at 140° C. for two hours. The plies are then individually pressed at low pressure in a chase for 1.5 minutes at 340° C. and subsequently pressed together at 340° C. for two minutes to form a tough, pale yellow, substantially void-free 6-ply laminate containing about 34% resin by weight. A sample of the resin component has an inherent viscosity of about 0.5 as measured in meta-cresol at 25° C. A further sample of the resin component has a degree of crystallinity of about 10–20% as determined by analysis of X-ray spectrometer diffraction patterns. Average results of standard ASTM tests on the laminate are as follows:

(A) Flexural strength, D-650, 69,000 p.s.i.
(B) Compressive strength, D-695, 37,500 p.s.i.
(C) Izod impact strength, D-256, 16.5 ft. lb./in., notch
(D) Flexural modulus, D-790:
    (a) As measured at 23° C., 3,300,000 p.s.i.
    (b) As measured after 1 hr. boil in water, 100% of (a)
    (c) As measured at 250° C., 72% of (a)
(E) Dielectric constant, D-150, at $10^3$ cycles, 5.8
(F) Dissipation factor, D-150, at $10^3$ cycles, 0.008
(G) Volume resistivity, D-257, at 50% R.H., 23° C., $2.7 \times 10^3$ ohm/cm.
(H) Arc resistance, D-495, 184 sec.
(I) Equilibrium water absorption, D-570, 0.1–0.3%.

At temperatures of 340–380° C., the laminate is readily postformed, deep-drawn, or welded to itself to form articles of complex shape. It is also sufficiently malleable to be cold-formed to an appreciable degree.

From the foregoing values, in comparison to those reported in the literature for similar reinforced plastic compositions based on glass and organic thermosetting resins (see for example Modern Plastics Encyclopedia Properties Chart) it will be apparent that this laminate compares favorably with respect to mechanical, electrical, and moisture-resisting properties generally, and is outstanding with respect to retention of rigidity at elevated temperatures.

Example II

The procedure of Example I is duplicated in essential details except that nonamethylenediamine is used. The properties of the product are similar to those of the preceding example, except that the compressive strength is about 11,000 p.s.i., the Izod impact strength is about 9 ft. lbs. per inch of notch, and the water absorption is about 0.7%. A measurement of crystallinity of the resin component by the X-ray spectrometer method indicates a crystallinity of about 50%.

Example III

Poly-4,4-dimethylheptamethylene pyromellitimide having an inherent viscosity of about 0.6 in the form of a 2–5 mil thick film is used to make an assembly of seven layers of film interspersed with 6 layers of 181–112 glass cloth. The assembly is pressed at 1000 p.s.i. between sheets of aluminum foil for 3 minutes at 360–390° C. and allowed to cool. A laminate similar in strength properties to that of Example I is obtained, except that the compressive strength is about 15,000 p.s.i. and the moisture absorption is somewhat higher.

Example IV

Poly-4,4-dimethylheptamethylene pyromellitimide having an inherent viscosity of about 0.9 is dissolved in hot metacresol. The resulting solution is used to coat one surface of each of two flat glass plates ⅛ inch thick which have been carefully cleaned and heated above 150° C. The solvent is evaporated and the coated surfaces are then pressed together in a press at low pressure and heated until excess resin flows out from between the plates, leaving a substantially void-free resin interlayer. The resulting sandwich is allowed to cool in air. The shear strength of the bond is determined by placing the sandwich in a slot between vertically positioned metal blocks, the mating ends of which form an angle of 45° to the horizontal. The lower block is supported on bearings such that it can move in the horizontal plane under the impetus of a downward thrust. Pressure is applied to the upper block and the bond fails at the glass to resin-surface at a shear stress of 5000 p.s.i.

Comparative tests on similarly prepared sandwiches with other thermoplastic resins indicate shear strengths of 180 in the case of polystyrene, 1600 for polyvinyl butyral, 2500 for polyhexamethyleneadipamide, and 2800 to 3200 for other polypyromellitimides of the group broadly defined hereinabove. Tests on sandwiches having interlayers of thermosetting resins range from about 2500 for a cross-linked polymethacrylate to about 3700 p.s.i. for epoxide resins.

Example V

A sandwich of ¹⁄₁₆" glass plates and poly-4,4-dimethylheptamethylene pyromellitimide, similar to that described in Example IV, is heated to 350° C. and bent slowly to an angle of 45° over a 3" diameter mandrel and then cooled slowly to room temperature. No delamination occurs. The resulting curvilinear product is transparent.

Example VI

A quantity of heat-cleaned glass fibers having a diameter of about 2 mils and an average length of about ¼" is slurried with an aqueous solution prepared as described in Example I, and the resulting mixture is dried on a tray at 100° C. for 2 hours and thereafter at 140° C. for two hours to yield a porous mat about ⅛" in thickness. The mat is pressed at low pressure at 350° C. for 3 minutes and then allowed to cool to room temperature to obtain a thin tough composite containing about 20% glass by weight. The flexural modulus of the composite is 634,000 at room temperature and 630,000 at 125° C. A sample of the composite is boiled in water for 12 months without appreciable effect on its properties. A sample boiled in mild soap solution for five months loses 3% of its original weight but shows no other change. Samples submerged in ethanol, carbon tetrachloride, hexane, concentrated hydrochloric acid, turpentine, and linseed oil are unchanged after 800 hours at room temperature. Exposure of a sample to mixed steam and air for six months caused no change in color, weight or toughness. A sample shows no change after being heated for 350 hours in motor oil at 197° C.

The resin/glass composites of the present invention are useful in a wide variety of applications where their strength temperature resistance, moisture resistance, electrical properties, antifriction properties or ready fabricability are advantageous. For example, they may be used as materials of construction for buildings, vehicles, cartons, machine parts, electrical insulation, electrical parts, bearings, slides, hotwater pipe, dining hall serving trays, etc. In both low- and high-molecular weight resin forms, the composites are readily fabricated by matched-die molding. In the high-molecular weight forms they may also be sawed, stamped, punched, drilled and otherwise shaped by conventional methods, as well as deep-drawn, molded, welded, laminated, or otherwise shaped while hot. Because the resin components are malleable, particularly as respects the composites based on poly-4,4-dimethylheptamethylene pyromellitimide, they are capable of being forced into tightly sealing relationship with themselves or other materials. Numerous other advantages and applications will be apparent to those skilled in the art.

We claim:

1. A glass-reinforced thermoplastic resin composition, substantially unaffected in form and strength by boiling water and having a resin-to-glass bond shear strength of at least 2800 lb./sq. inch, consisting essentially of reinforcing glass and synthetic linear polypyromellitimide of low to moderate crystallinity having an inherent viscosity at 0.5 percent concentration and 25° C. in meta-cresol of at least 0.4, a glassy-state transition temperature of at least 100° C., a crystalline melting point not exceeding 400° C., and, as the sole recurring integral members of the main polymer chain, carbon and nitrogen bonded only to said carbon.

2. Composition of claim 1 in the form of a sheet having a thickness not exceeding 0.125 inch.

3. Composition of claim 1 wherein the reinforcing glass is in fibrous form, present in resin-to-glass ratio of from 4/1 to 3/7.

4. Composition of claim 3 wherein the fibrous glass is in the form of woven glass.

5. Composition of claim 1 wherein the polypyromellitimide is polynonamethylene pyromellitimide.

6. Composition of claim 1 wherein the polypyromellitimide is poly-4,4-dimethylheptamethylene pyromellitimide 7. Composition of claim 6 in the form of a sheet having a thickness not exceeding 0.125 inch wherein the glass is woven glass persent in glass-to-resin weight ratio in the range of 6/4 to 7/3.

References Cited in the file of this patent

UNITED STATES PATENTS

| | | |
|---|---|---|
| 2,191,367 | Carothers | Feb. 20, 1940 |
| 2,322,771 | Palm et al. | June 29, 1943 |
| 2,359,877 | Schupp | Oct. 10, 1944 |
| 2,563,289 | Steinman | Aug. 7, 1951 |
| 2,577,205 | Meyer et al. | Dec. 4, 1951 |
| 2,710,853 | Edwards et al. | June 14, 1955 |

FOREIGN PATENTS

| | | |
|---|---|---|
| 570,858 | Great Britain | July 25, 1945 |